(12) United States Patent
Chen et al.

(10) Patent No.: US 7,251,213 B2
(45) Date of Patent: Jul. 31, 2007

(54) METHOD FOR REMOTE MEASUREMENT OF ECHO PATH DELAY

(75) Inventors: Bing Chen, Westfield, NJ (US); Wallace F. Smith, Jr., Sea Girt, NJ (US)

(73) Assignee: AT&T Corp., New York, NY (US)

( * ) Notice: Subject to any disclaimer, the term of this patent is extended or adjusted under 35 U.S.C. 154(b) by 1024 days.

(21) Appl. No.: 10/245,769

(22) Filed: Sep. 17, 2002

(65) Prior Publication Data

US 2004/0052220 A1 Mar. 18, 2004

(51) Int. Cl.
*H04J 1/12* (2006.01)
(52) U.S. Cl. .................. 370/201; 379/406.01
(58) Field of Classification Search ............... 370/286, 370/288; 379/406.5
See application file for complete search history.

(56) References Cited

U.S. PATENT DOCUMENTS

| | | | | |
|---|---|---|---|---|
| 3,721,777 A * | 3/1973 | Thomas | ............ | 379/406.08 |
| 4,282,411 A | 8/1981 | Stewart | ............ | 179/170.2 |
| 4,539,675 A | 9/1985 | Fisher | ............ | 370/32 |
| 4,577,071 A | 3/1986 | Johnston et al. | ............ | 179/170.2 |
| 4,587,382 A * | 5/1986 | Yang | ............ | 370/291 |
| 4,609,787 A * | 9/1986 | Horna | ............ | 379/406.08 |
| 4,669,115 A | 5/1987 | Messerschmitt | ............ | 379/402 |
| 4,887,257 A | 12/1989 | Belloc et al. | ............ | 370/32.1 |
| 5,014,263 A | 5/1991 | Vairavan et al. | ............ | 370/32.1 |
| 5,157,653 A | 10/1992 | Genter | ............ | 370/32.1 |
| 5,274,705 A | 12/1993 | Younce et al. | ............ | 379/410 |
| 5,307,405 A | 4/1994 | Sih | ............ | 379/410 |
| 5,371,789 A * | 12/1994 | Hirano | ............ | 379/406.08 |
| 5,475,731 A | 12/1995 | Rasmusson | ............ | 379/3 |
| 5,477,534 A | 12/1995 | Kusano | ............ | 370/32.1 |
| 5,533,121 A * | 7/1996 | Suzuki et al. | ............ | 379/406.02 |
| 5,559,881 A | 9/1996 | Sih | ............ | 379/410 |
| 5,598,468 A | 1/1997 | Ammicht et al. | ............ | 379/410 |
| 5,646,991 A | 7/1997 | Sih | ............ | 379/410 |
| 5,673,268 A * | 9/1997 | Sharma et al. | ............ | 370/522 |
| 5,687,229 A | 11/1997 | Sih | ............ | 379/410 |
| 5,721,782 A * | 2/1998 | Piket et al. | ............ | 381/66 |
| 5,987,098 A | 11/1999 | Wintour | ............ | 379/3 |
| 6,028,929 A | 2/2000 | Laberteaux | ............ | 379/410 |
| 6,044,068 A * | 3/2000 | El Malki | ............ | 370/286 |
| 6,055,311 A * | 4/2000 | Dreyfert et al. | ............ | 379/406.08 |
| 6,064,873 A * | 5/2000 | Eriksson et al. | ............ | 455/403 |
| 6,078,567 A * | 6/2000 | Traill et al. | ............ | 370/289 |
| 6,160,886 A * | 12/2000 | Romesburg et al. | ............ | 379/406.05 |
| 6,198,819 B1 | 3/2001 | Farrell et al. | ............ | 379/410 |
| 6,266,409 B1 | 7/2001 | Laberteaux et al. | ............ | 379/410 |
| 6,337,907 B1 | 1/2002 | Laberteaux et al. | ............ | 379/406.08 |

(Continued)

FOREIGN PATENT DOCUMENTS

EP 0287742 A1 10/1988

(Continued)

*Primary Examiner*—Chi Pham
*Assistant Examiner*—Thai Hoang
(74) *Attorney, Agent, or Firm*—Peter V. D. Wilde

(57) ABSTRACT

A method of measuring echo path delay in a circuit having echo cancellers after enabling an echo signal to pass through the echo cancellers. The known time for a given echo canceller to disable is subtracted from the overall test signal duration. This quantity can be subtracted from the overall echo duration to compute the echo path delay.

18 Claims, 9 Drawing Sheets

U.S. PATENT DOCUMENTS

| | | |
|---|---|---|
| 6,347,140 B1 | 2/2002 | Tahernezhaadi et al. ............. 379/406.01 |
| 6,351,531 B1 | 2/2002 | Tahernezhaadi et al. ............. 379/401.01 |
| 6,408,070 B2 | 6/2002 | Farra ............. 379/406.01 |
| 6,625,279 B1* | 9/2003 | Eom ............. 379/406.01 |
| 6,738,358 B2* | 5/2004 | Bist et al. ............. 370/289 |
| 6,816,592 B1* | 11/2004 | Kirla ............. 379/406.05 |
| 6,999,560 B1* | 2/2006 | Connor et al. ............. 379/3 |
| 7,003,097 B2* | 2/2006 | Marchok et al. ............. 379/406.01 |
| 2001/0016041 A1 | 8/2001 | Younce et al. ............. 379/406.01 |
| 2001/0043701 A1 | 11/2001 | Farra ............. 379/406.01 |
| 2002/0064139 A1* | 5/2002 | Bist et al. ............. 370/289 |
| 2004/0001450 A1* | 1/2004 | He et al. ............. 370/286 |

FOREIGN PATENT DOCUMENTS

| | | |
|---|---|---|
| EP | 0287742 B1 | 1/1993 |
| EP | 0542882 B1 | 5/1998 |
| EP | 1119172 A2 | 7/2001 |
| EP | 0615674 B1 | 11/2001 |
| EP | 1152547 A2 | 11/2001 |
| WO | 94/08418 | 4/1994 |
| WO | 98/34353 | 8/1998 |
| WO | 99/26390 | 5/1999 |
| WO | 99/26399 | 5/1999 |
| WO | 99/26400 | 5/1999 |
| WO | 99/26401 | 5/1999 |
| WO | 99/26402 | 5/1999 |
| WO | 99/26403 | 5/1999 |
| WO | 99/59320 | 11/1999 |
| WO | 01/54382 A1 | 7/2001 |

* cited by examiner

FIG. 6
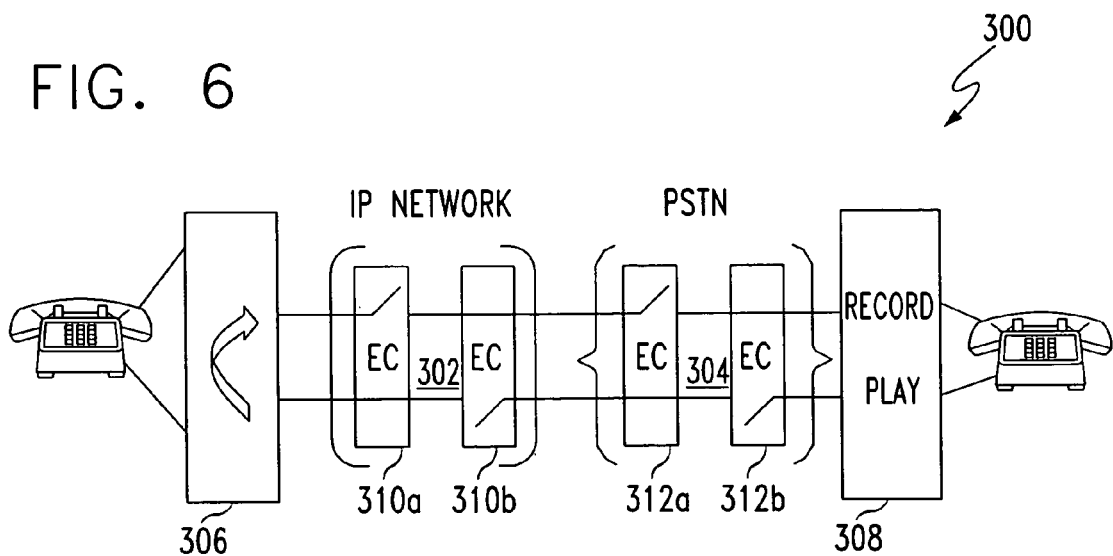
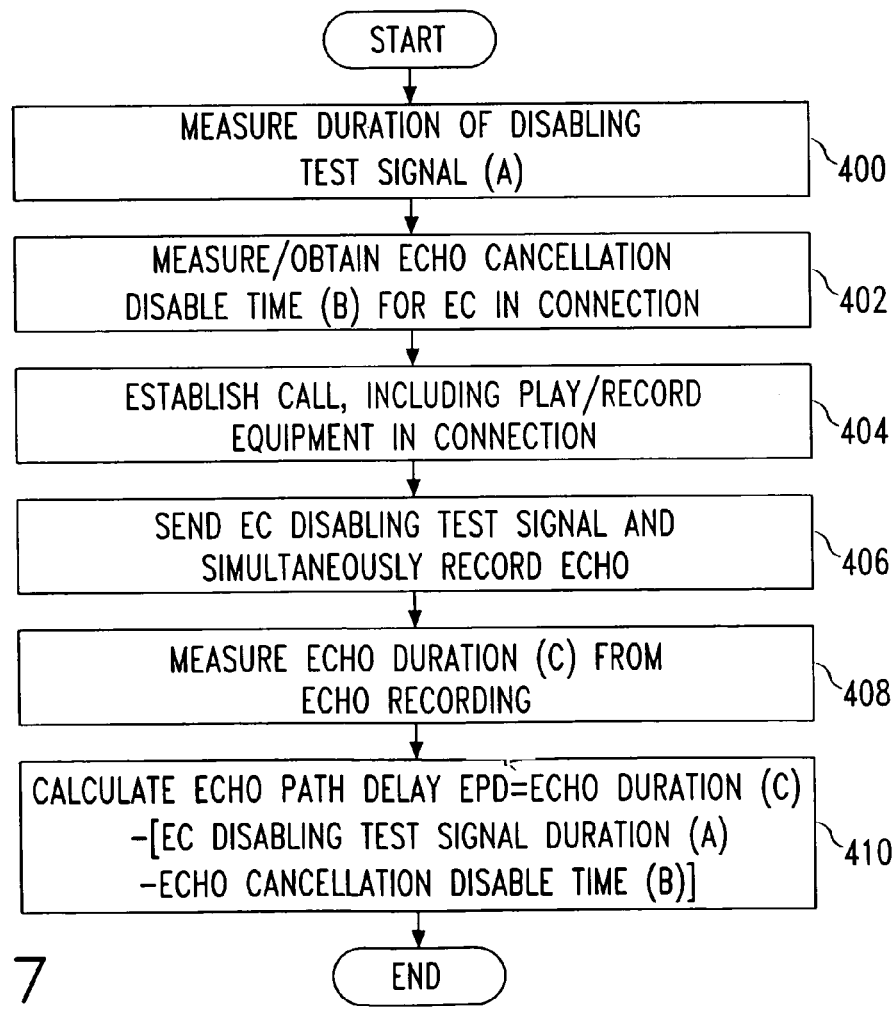
FIG. 7

METHOD FOR REMOTE MEASUREMENT OF ECHO PATH DELAY

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to communication networks and, more particularly, to echo cancellation in communication networks.

BACKGROUND OF THE INVENTION

As is known in the art, echo in networks, such as telephone circuits, is primarily caused by the reflection of energy due to impedance mismatches at 4-to-2 wire junctions, which are commonly known as hybrids. In conventional telephone circuits, echo cancellers (ECs) are placed at various locations in the network to cancel this echo. In Internet Protocol (IP) networks, echo cancellers are placed inside the network gateways. It is often desirable to characterize echo path(s). Parameters of interest include the delay associated with the echo path (EPD) of the canceller and the echo return loss (ERL). This information is useful for troubleshooting field echo control problems and network characterizations.

Field-deployed echo cancellers can fail to control echo for a number of reasons. Two reasons for such failures include the EPD exceeding the operating range of the canceller, and the ERL associated with the echo path being so low that the canceller categorizes the echo as the speech signal of the party nearer to the EC and thus, allows the echo to pass through. However, when troubleshooting complaints of echo in conventional or IP telephone networks using known techniques, collecting information on these two parameters is difficult.

It would, therefore, be desirable to overcome the aforesaid and other disadvantages.

SUMMARY OF THE INVENTION

The present invention provides a method for measuring echo path delay for remote network echo canceller(s) using equipment located in a single, centralized site, for example. In general, using a defined source signal, echo cancellation in the echo cancellers is disabled and the resulting echo signal duration is measured. The echo path delay can be derived from the overall resulting echo signal duration. With this arrangement, the echo path delay can be determined in circuits containing one or more echo cancellers. While the invention is primarily shown and described in conjunction with circuit-switched/IP telephone networks having echo cancellers, it is understood that the invention is applicable to networks in general in which it is desirable to determine the echo path delay.

In one aspect of the invention, a signal (e.g., a 2100 Hz tone with periodic 180° phase reversals at 450 msec intervals) disables echo cancellation in the echo canceller so that the duration of an echo signal at an output of the echo canceller can be measured. In one embodiment, the echo path delay is derived by subtracting a time duration from the echo signal duration. The time duration corresponds to the duration of the disabling signal after echo cancellation is disabled, i.e., the remainder of the test signal that has not yet reached the echo canceller at the time the echo canceller is disabled. Echo cancellation disable times for a variety of known echo cancellers can be determined if not already known.

BRIEF DESCRIPTION OF THE DRAWINGS

The invention will be more fully understood from the following detailed description taken in conjunction with the accompanying drawings, in which:

FIG. 6 shows a schematic diagram of a test configuration that can be used for verification of the echo path delay measurement and for measurement of echo cancellation disabling time in accordance with the present invention; and FIG. 7 is a flow diagram showing an exemplary sequence of steps for measuring echo path delay in accordance with the present invention.

DETAILED DESCRIPTION OF THE INVENTION

Figure 1:
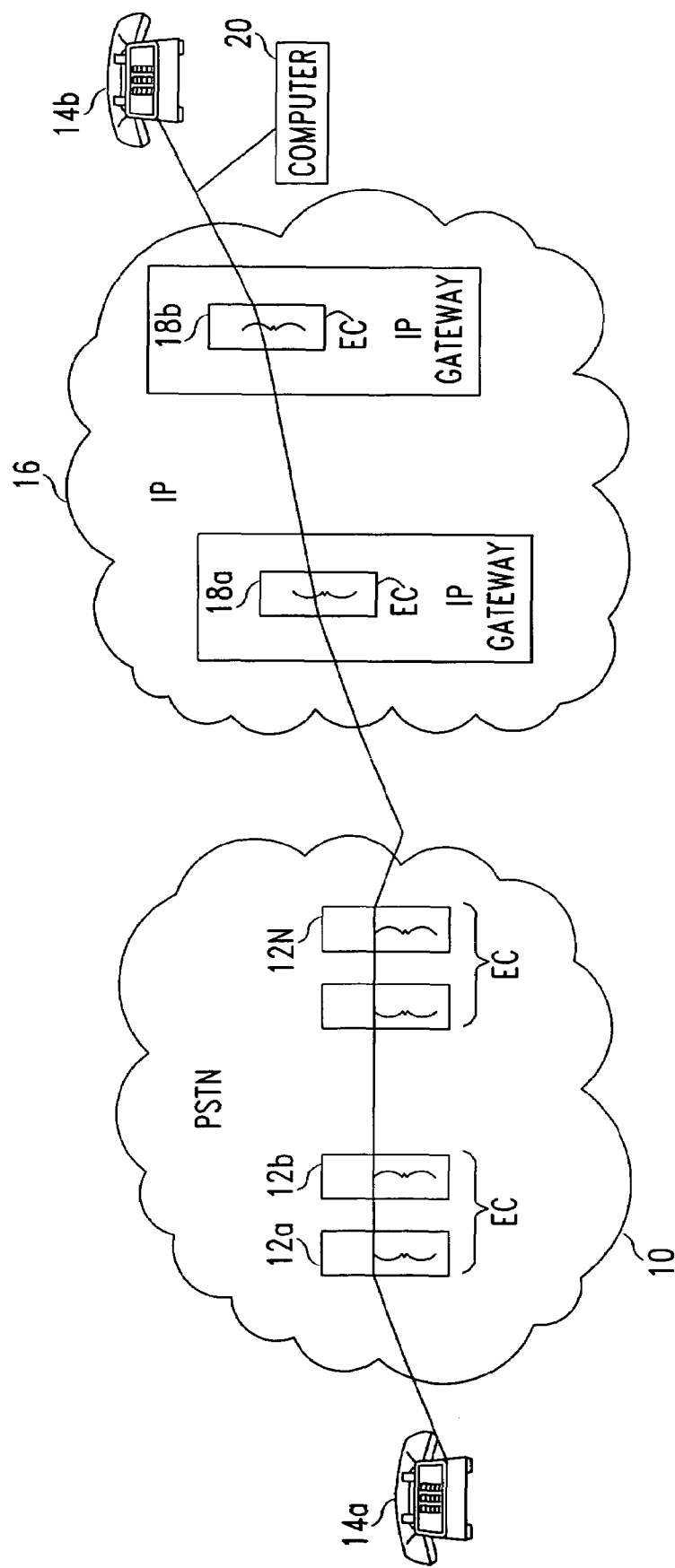
FIG. 1 is a schematic block diagram of a network in which echo path delay can be measured in accordance with the present invention.

FIG. 1 shows a network 10 including a series of echo canceller pairs 12a-N at various locations in the network that serve various subscribers at telephones 14a,b, for example, for which echo path delays can be measured in accordance with the present invention. The network 10 can be coupled to other networks, e.g., an Internet Protocol (IP) Network 16 such as the Internet. The IP network 16 media gateways can include echo cancellers 18a,b along paths through the IP network. In an exemplary embodiment, a computer 20 can be connected to the telecommunication network at the location of a network telephone, e.g., 14b, to measure the EPD for a remote echo canceller 12a. The computer can also be located at 14a location to measure echo canceller 18b EPD. The computer 20 should have the capability to simultaneously play and record signal files to effect EPD measurements, as described more fully below.

It is understood that the network can be provided in a variety of topologies and types including PSTN (Public Switched Telecommunications/Telephone Network) and packet networks, which can contain multiple echo cancellers.

Figure 1A:
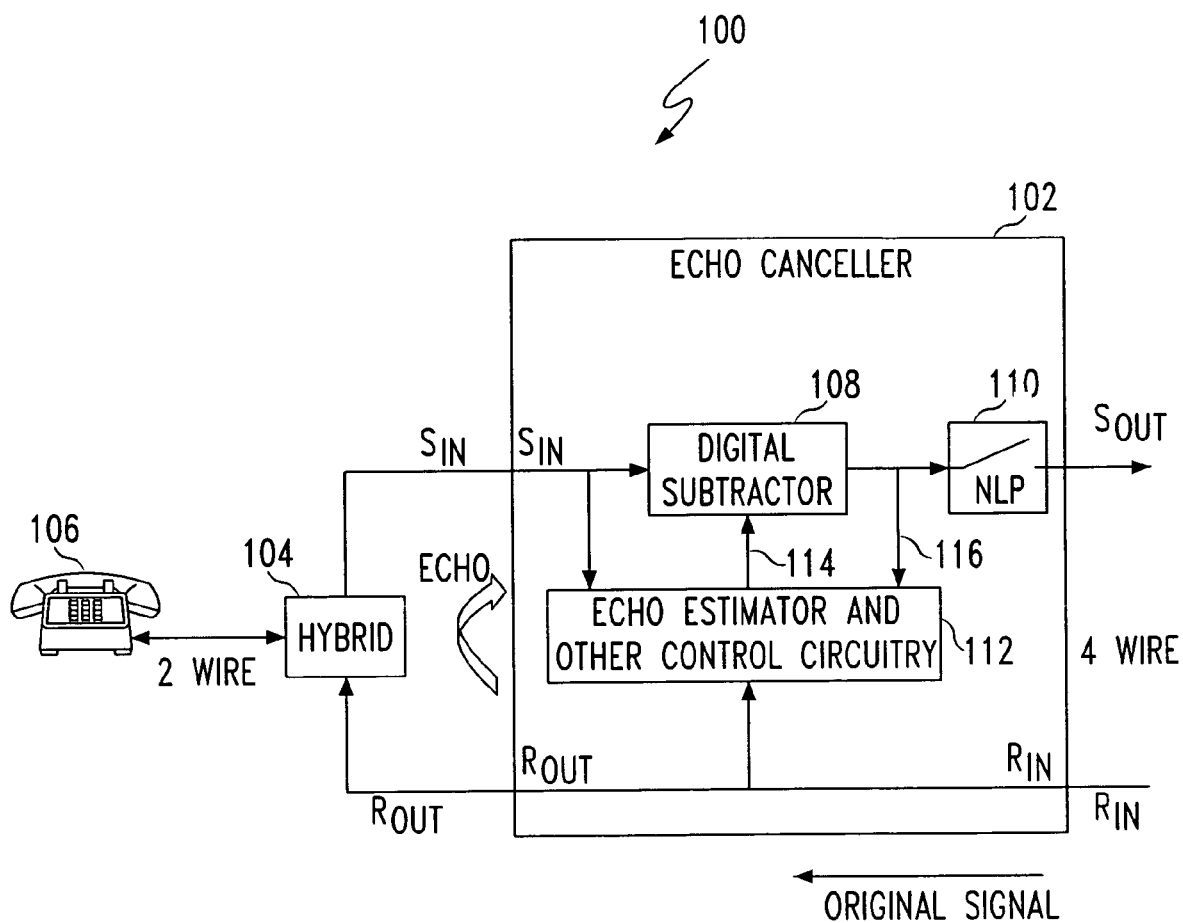
FIG. 1A is a schematic block diagram showing certain echo canceller components and a portion of a telephone circuit producing echo for which echo path delay measurements can be performed in accordance with the present invention.

FIG. 1A shows a portion of a telephone network 100 including an echo canceller 102 for which the echo path delay can be measured, as described in detail below. In general, equipment located at a location, such as a 1ab, is used to measure the remote EC's Echo Path Delay (EPD). The echo canceller 102 includes a tone-disabling feature that disables echo cancellation. This feature facilitates the gathering of EPD information by determining the duration of an echo signal after echo cancellation in the echo canceller 102 is disabled.

The network 100 includes a hybrid circuit 104 disposed between a telephone 106 and the echo canceller 102. As is well known in the art, the hybrid 104 provides a 4-to-2 wire junction between the four-wire echo canceller 102 and the two-wire telephone 106. The echo canceller 102 receives a receive-in signal $R_{in}$ and provides a receive-out signal $R_{out}$ to the hybrid 104, and ultimately to the telephone 106. A signal originating at the telephone 106 combines with the $R_{out}$ signal energy reflected from the hybrid 104 (echo) to provide a send-in signal $S_{in}$ to the echo canceller 102. This signal is processed, which includes removing the echo, and output from the echo canceller 102 as the send-out signal $S_{out}$.

The echo canceller (EC) 102 includes a digital subtractor 108, a non-linear processor (NLP) 110, and an echo estimator/control circuit 112 for processing the echo signal. The digital subtractor 108, which receives the send-in signal $S_{in}$, is coupled in series with the NLP 112, which outputs the send-out signal $S_{out}$. The echo estimator/control circuit 112 monitors the receive-in signal $R_{in}$ that is output unchanged as the receive-out signal $R_{out}$. The echo estimator/control circuit 112 also monitors the send-in signal $S_{in}$ and a signal 116 output from the digital subtractor 108. The structure and operation of echo cancellers is well known to one of ordinary skill in the art.

In an exemplary embodiment, the Echo Path Delay (EPD) measurements are performed under so-called single-talk conditions, which requires a "quiet" call termination, e.g., where the signal power is less than about −50 dBm. In an illustrative embodiment, a quiet call termination can be achieved by covering the mouthpiece of the telephone handset in an environment that is relatively free of background noise.

In operation, with a quiet call termination, the EC 102 monitors, via the echo estimator/control circuit 112, the original signal in the receive path ($R_{in}$ to $R_{out}$). The signal passes through the EC Receive-out $R_{out}$ port through the 4-to-2 wire hybrid 104 to the listener via the telephone 106. Some of the energy in the speech (receive-out signal Rout) is reflected back from the hybrid 104 due to differences in impedance on its 2-wire and 4-wire sides to the Send-in $S_{in}$ port of the echo canceller 102 generating an echo path signal. As used herein, Echo Path Delay (EPD) refers to the signal transmission time for an echo signal between the echo canceller $R_{out}$ and $S_{in}$ ports. Echo return loss is the difference in power between the original transmitted ($R_{out}$) and echoed signal (at $S_{in}$).

The EC 102 echo estimator 112 looks for correlation between the receive-in $R_{in}$ and the send-in $S_{in}$ signals to compute an estimate of the echo that is then subtracted from its send-path by the digital subtractor 108. The EC non-linear processor (NLP) 110 is activated when there is a relatively strong receive-in signal $R_{in}$ as compared to the send-in signal $S_{in}$, e.g., $R_{in}$ greater than 15 dB to 20 dB stronger than $S_{in}$. When activated, the NLP 110 acts like an open switch that prevents any residual echo from the output of the digital subtractor 108 to exit the echo canceller at $S_{out}$.

Figure 2:
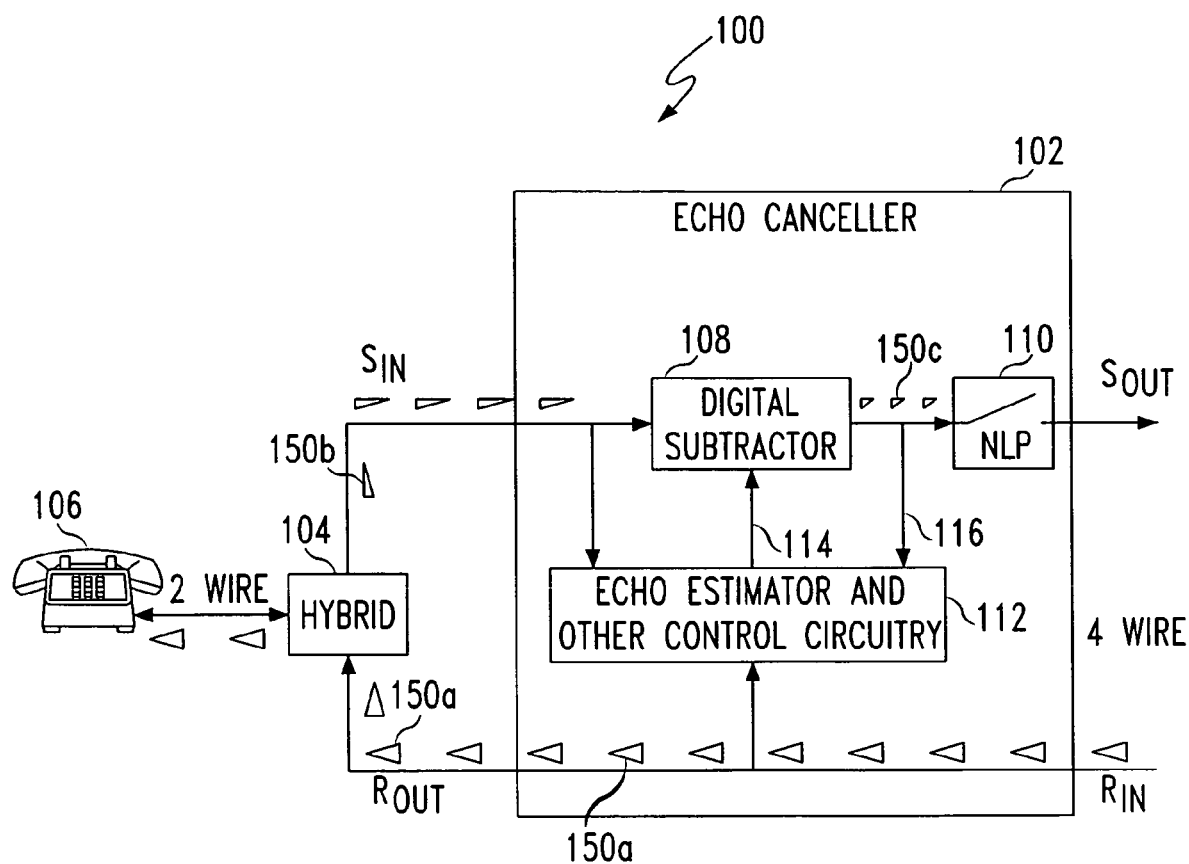
FIG. 2 is a schematic block diagram of the telephone circuit of FIG. 1A in single talk mode.

FIG. 2 shows "normal" EC operation for single-talk (quiet termination) conditions. Single talk occurs when energy (speech or data signal) is present at the echo canceller 102 $R_{in}$ signal port and only (or close thereto) the echo of the $R_{in}$ signal is present at the EC $S_{in}$ signal port. FIG. 2, which is similar to FIG. 1A for which like reference numbers indicate like elements, further includes triangles 150a,b,c that represent the signals to, from and through, respectively, the EC 102. The shape and size of the triangles 150 are roughly indicative of differences in the echo signal as it changes frequency and level when it passes through the 4-to-2 wire hybrid 104 and the EC 102. Because the signal at the EC 102 receive-in $R_{in}$ port is strong compared with the signal at the EC send-in $S_{in}$ port during single talk, the NLP 110 is activated and the signal at the signal out $S_{out}$ port is silence or line noise. Operation of the echo canceller 102, including its components 108, 110, 112, is well known to one of ordinary skill in the art.

On a data connection prior to data transmission, a 2100 Hz phase-reversed tone is sent by the answering modem. This tone instructs all ECs, such as EC 102, provisioned along the call connection to disable echo cancellation so as to prevent distortion of the digital data. The EC 102 has a disabling tone detector located in the control circuitry 112 that detects valid tones and disables echo cancellation. When echo cancellation disabling occurs, the digital subtractor 108 function ceases and the NLP 110 deactivates, acting like a closed switch, so that the signal from the $S_{in}$ port passes through to the $S_{out}$ port unchanged. Echo cancellation is typically disabled when the second 180° phase reversal of a 2100 Hz phase-reversed tone is detected, which is usually 900 ms after the start of the tone. Detailed requirements for the disabling tone and tone detector are found in International Telecommunications Union (ITU)-T Recommendations G.165 and G.168, which are incorporated herein by reference. For some echo cancellers, the NLP can be disabled after the first 180° phase reversal (e.g., 450 ms after the start of the tone) or after the second phase reversal with a total disable time up to 1000 ms, for example.

Figure 3:
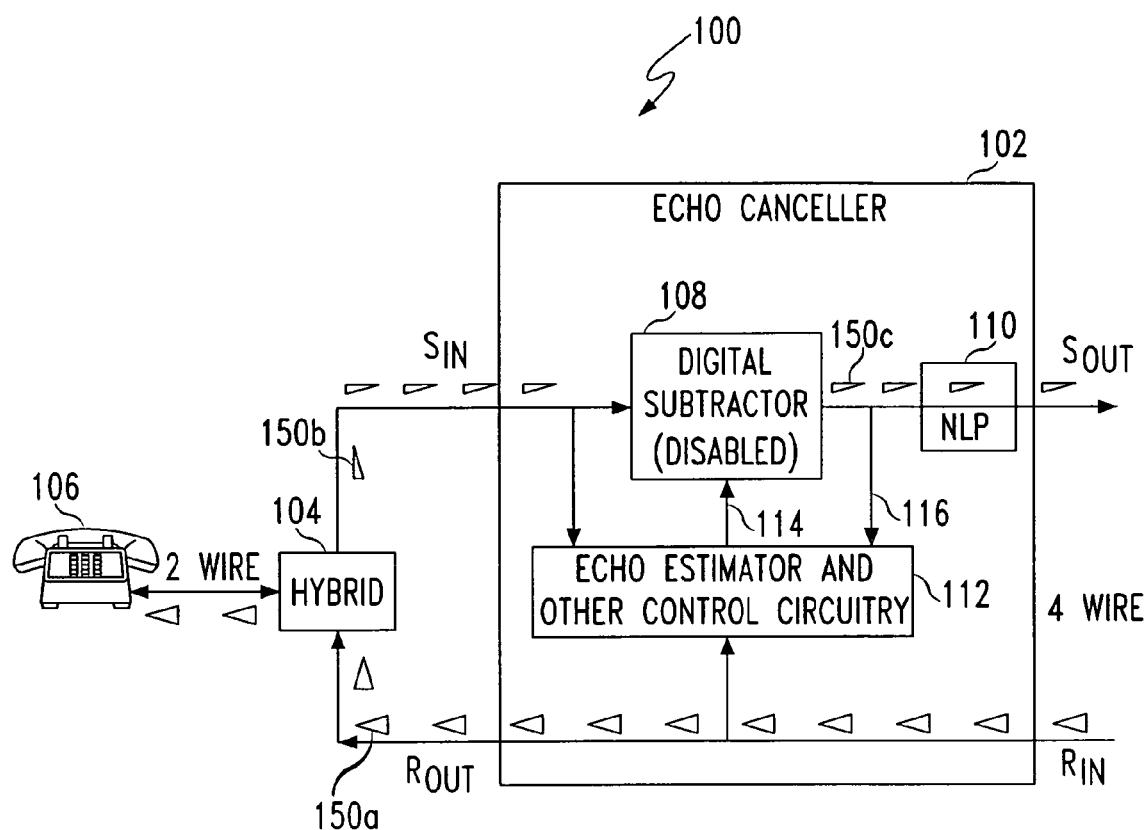
FIG. 3 is a schematic diagram of the telephone circuit of FIG. 1A after disabling echo cancellation.

FIG. 3 illustrates what happens when the phase-reversed tone is detected by the EC 102 and echo cancellation is disabled. The digital subtractor 108 and the NLP 110 deactivate so that the signal 150c passing from the EC $S_{out}$ port is the same as the signal 150b entering the EC 102 $S_{in}$ port. In the single talk situation, the send-out signal $S_{out}$ is comprised solely, or relatively close thereto, of the echo of the receive-in $R_{in}$ signal.

Figure 4:
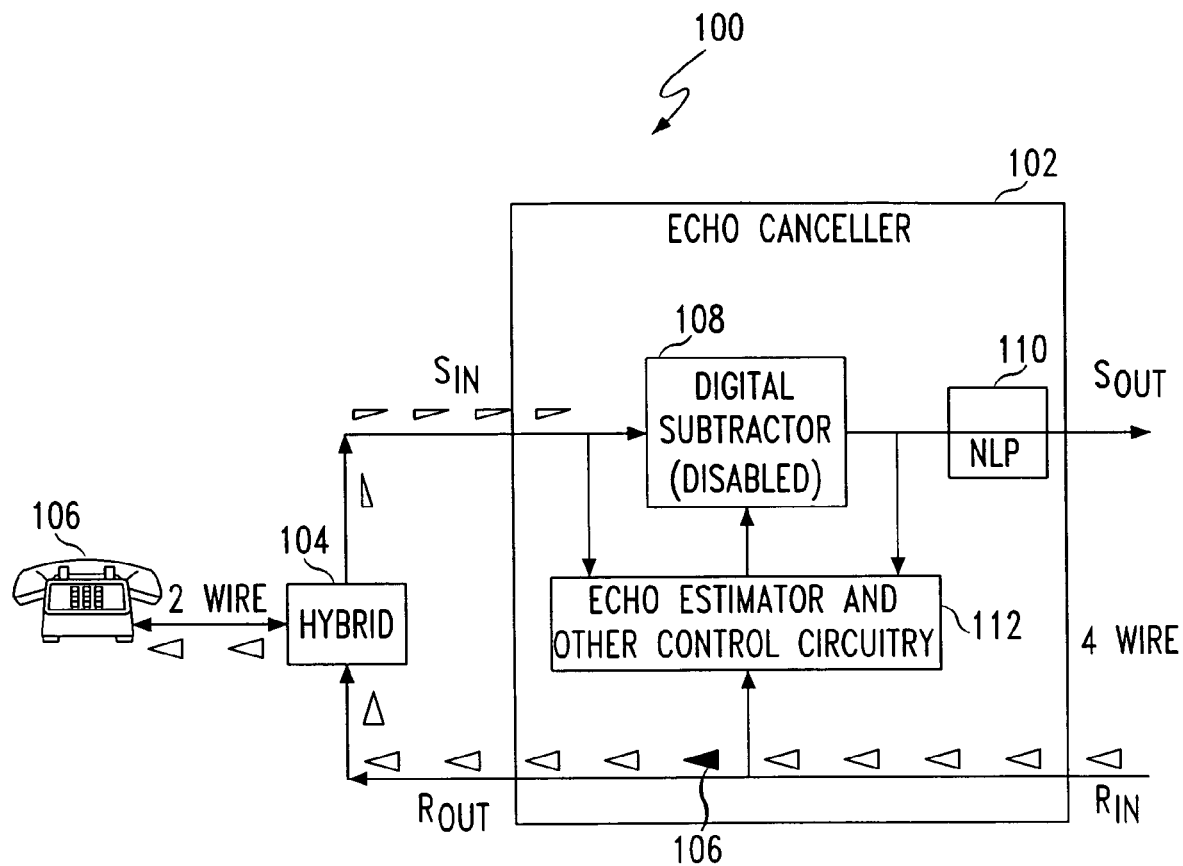
FIG. 4 is a schematic diagram of the telephone circuit of FIG. 1A at a time of disabling echo cancellation.

FIG. 4 shows an ideal case in which there is no delay between the receipt of a sample 160 (indicated as a darkened triangle) containing the second phase reversal and disabling echo cancellation. That is, the darkened triangle 160 represents the sample containing the phase reversal. Prior to this sample reaching the EC 102, the echo was cancelled by the digital subtractor 108 and any residual echo was blocked by the NLP 110. At the moment the sample 160 reaches the control circuitry 112, the echo signal is immediately allowed to pass through the EC 102 $S_{in}$ to $S_{out}$ (send) path unaltered. Therefore, samples in the echo path ($R_{out}$ to $S_{in}$ of the EC 102) at the instant that disabling occurs are allowed to pass through the send path of the EC 102, as are subsequent samples traveling through the receive path. The duration of the echo from the EC 102 $S_{out}$ port is equal to the duration of the signal following the second phase reversal plus the time it takes for the signal to travel through the echo path. Since the post-phase-reversal signal duration is a known quantity, it can be subtracted from the overall echo signal duration to compute the echo path delay.

Figure 4A:
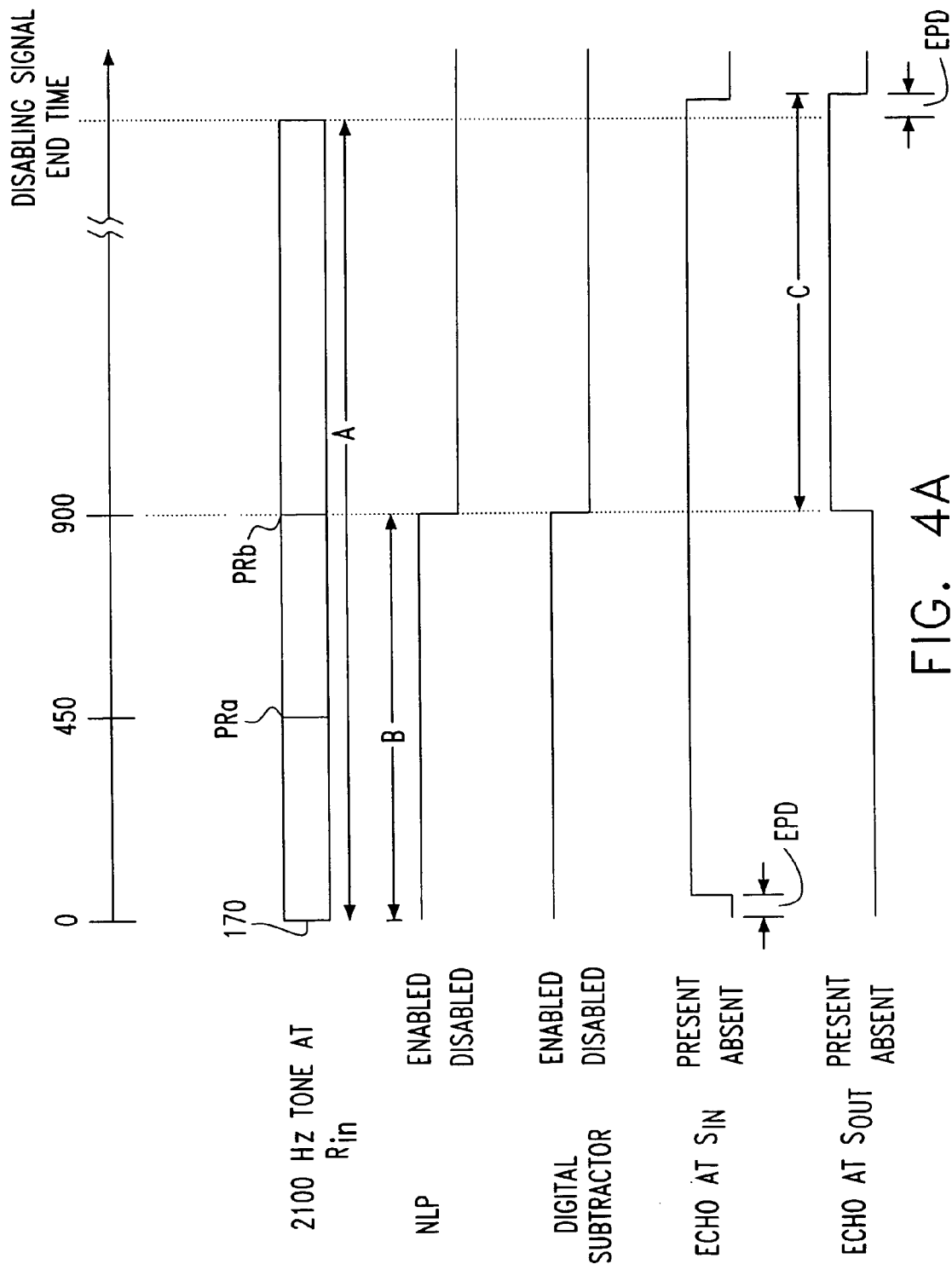
FIG. 4A is a timing diagram illustrating echo path delay measurements for an echo canceller in the zero delay condition in accordance with the present invention.

FIG. 4A, in combination with FIG. 4, shows a timing diagram corresponding to the no delay case where there is no delay between the receipt of a second phase reversal sample and echo cancellation disabling. The 2100 Hz phase reversal signal 170, which has a duration A, contains first and second PRa, b, 180° phase reversals at exemplary times of 450 ms and 900 ms, respectively. At the second phase reversal PRb, the NLP 110 and the digital subtractor 108 are disabled. A time duration B is the echo canceller disable time, which is 900 ms in this example. The echo duration at the EC $S_{in}$ port is the same as the duration of the signal at the EC $R_{in}$ port (illustrated as "2100 Hz tone at $R_{in}$"), but is delayed due to the signal traveling through the echo path. The delay is equal to the EPD. When the NLP 110 and the digital subtractor 108 are disabled, the echo signal, which is present at the send-in signal $S_{in}$ port, becomes present at the send-out signal $S_{out}$ port. Assuming the delay from $S_{in}$ to $S_{out}$ to be negligible, the echo at the EC $S_{out}$ port starts at time PRb and ends with the absence of echo at the $S_{in}$ port for a total time duration C. The test signal duration A and echo canceller disable time B are known quantities. Thus, the EPD can be computed as the echo duration C minus the echo cancellation disable time B subtracted from the EC disabling test signal duration A, i.e., C−[A−B].

Figure 4B:
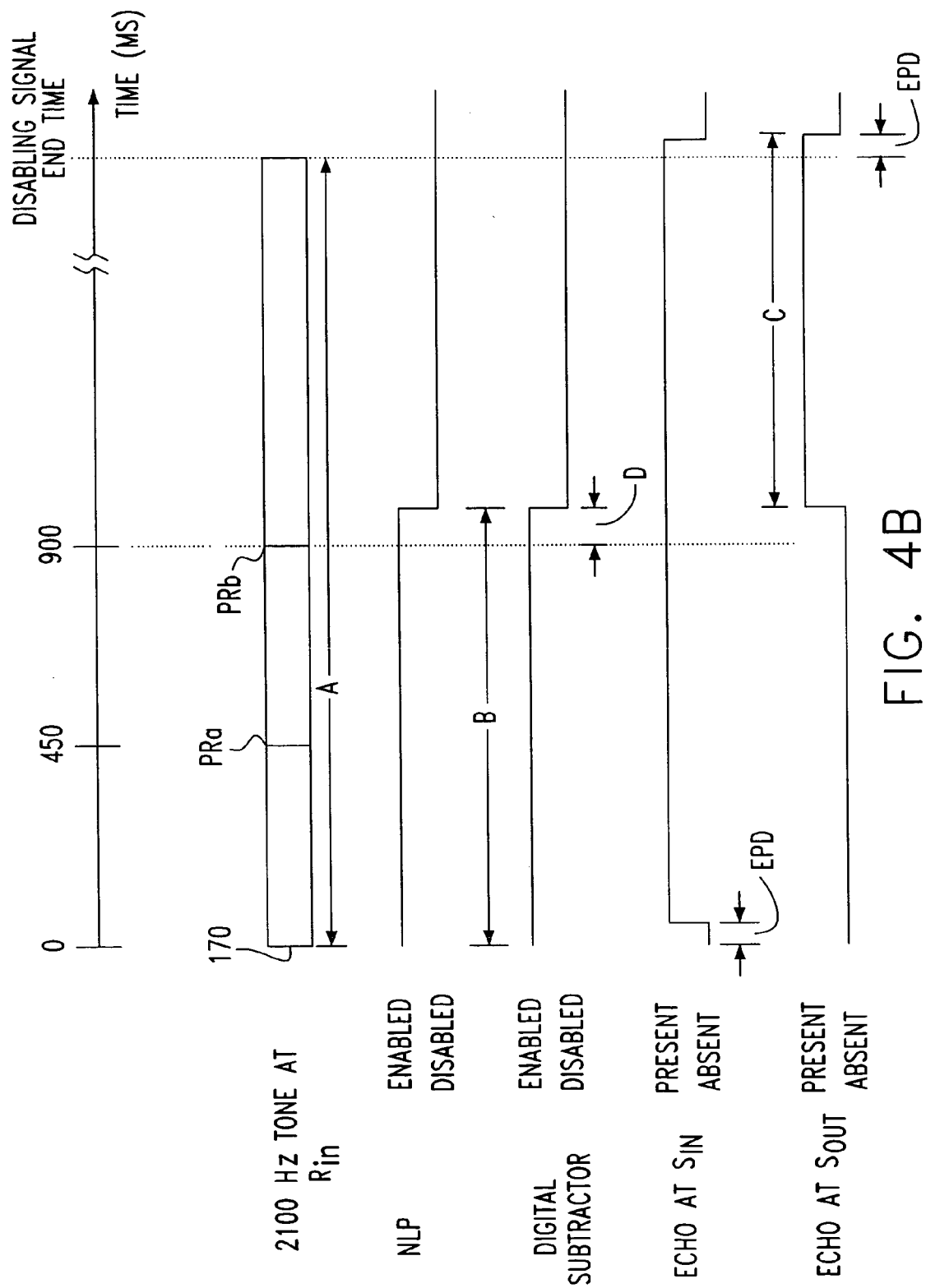
FIG. 4B is a timing diagram illustrating echo path delay measurement for an echo canceller in the constant, non-zero delay condition in accordance with the present invention.

As described above, in the no delay case, the post-second phase reversal signal duration [A−B] is a known quantity and can be subtracted from the overall echo signal duration C to derive the EPD. As shown in FIG. 4B, in actual equipment, there is a delay D between the receipt of the second phase reversal PRb and disabling of echo cancellation. This delay D is included in the echo cancellation disable time B. It is understood that the EC tone-disabling time differs from vendor to vendor and from one version of the same EC to another. If not known, tests can be performed to obtain this information. As in the previous example, the EPD is computed as C−[A−B].

Figure 5:
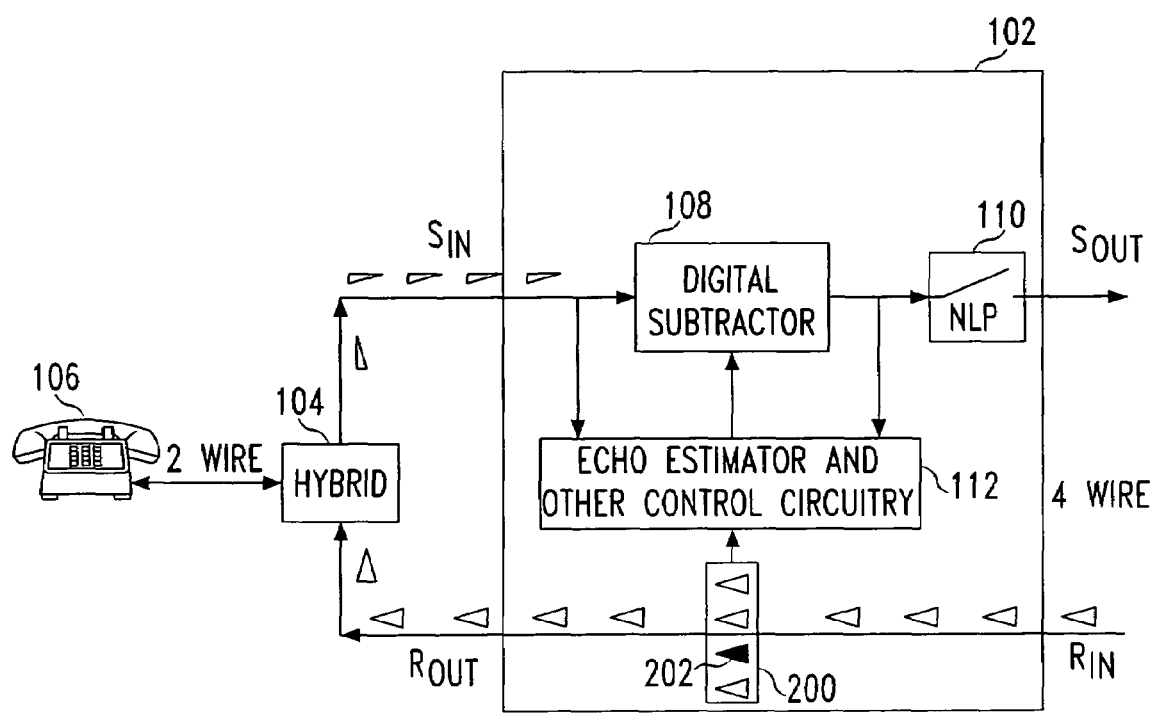
FIG. 5 is a schematic diagram of a portion of a telephone circuit including an echo canceller having a buffer (variable delay condition) in accordance with the present invention.

FIG. 5 shows more detail for EPD measurements in which case variable processing delays exist. FIG. 5, in which like reference numbers indicate like elements, is similar to FIG. 4 with the addition of a receive-side buffer 200. VoIP (Voice Over Internet Protocol) gateways, for example, frequently process information using buffers. Receive-side buffers 200 and send-side buffers (not shown) can introduce additional delays and variation in the detection of disabling signals since samples are not immediately processed by the EC 102.

A darkened triangle in the buffer 200 represents the sample 202 containing the second phase reversal. For block processing, if the sample 202 arrives early, it has to wait in the top of the buffer 200. The EC 102 disable time will be delayed until the buffer 200 is filled and the samples are processed. If the sample 202 arrives later and is placed into one of the last positions in the buffer 200, the overall delay will be shorter. This variability presents a challenge when trying to precisely measure the EPD. Because buffers introduce additional playout delay, the measured delay is always greater than or equal to the actual EPD. In this case, it is necessary to perform multiple measurements within the same call that increment the placement of the sample containing the tone's second phase reversal to possible positions in the buffer. The measurement that is made with the second phase reversal encountering the shortest playout delay reveals the true EPD—that is, the smallest EPD within the group of measurements.

FIG. 6 shows an exemplary configuration 300 for verifying EPD measurement in accordance with the present invention. This configuration, or a simplified version (only one EC is included), can also be used to gather echo canceller disable time (B) information if it is not known. An IP network 302 and a circuit-switched network 304 are coupled between a first and second digital 4-wire play and record platforms 306, 308. It is understood that a variety of laboratory test apparatus can be used to perform EPD measurements on networks with either individual or tandem ECs in the connection. In one particular embodiment, the first platform (apparatus) 306 is used to generate echo paths with controlled delay and loss settings. The second platform (apparatus) 308 is used to play the test signal, record the echo signal, measure the echo signal duration and compute the EPD. The IP network 302 and the circuit switched network 304 can include respective series of tandem ECs 310a,b, 312a,b. The EPD of EC 310a was then measured and compared with the first apparatus 306 EPD settings.

Echo paths were simulated by the first platform 306. For each delay setting, the test signal was played from the second platform 308 and the echo was recorded by the second platform 308. The test signal was a two-second long 2100 Hz tone at a level of −11 dBm, with periodic 180° phase reversals every 450 ms. It will be appreciated that the test signal parameters are not limited to those described herein. A variety of disabling signals and variations thereof can be used. In another embodiment, the test signal included a disabling tone followed by a 0 Hz to 4 kHz swept sine wave. One requirement for the signal following the disabling tone is that its power level be high enough to hold the EC in the disabled state. With the necessary information about the target EC's tone disabling time previously gathered, the recorded signal was analyzed to calculate the EPD, as shown and described above.

FIG. 7 shows an exemplary sequence of steps for implementing echo path delay measurement in accordance with the present invention. In step 400, the disabling test signal A is generated (if necessary) and the duration is measured if not already known. An echo cancellation disable time B for the EC of interest is then measured or obtained in step 402. It is understood that the disable time B includes the time it takes for the EC to recognize the disabling signal and the EC's delay in disabling echo cancellation. Steps 400 and 402 are performed in preparation for the EPD measurement. Once these parameters are determined, they need not be reacquired for subsequent EPD measurements performed through the same EC (vender and version). A call is then established to a quiet termination in step 404 with the play/record apparatus, such as platform 308 of FIG. 6, in place. In step 406, the EC disabling test signal A is sent and the echo is simultaneously recorded. The echo duration C is then measured from the recorded echo signal in step 408.

In step 410, the echo path delay is then computed as EPD=C−[A−B]. That is, the echo cancellation disable time duration B is subtracted from the EC disabling test signal duration A, the result of which is subtracted from the recorded echo signal duration C.

The present invention provides a method for determining echo path information to facilitate the diagnosis of field echo problems. With some a priori knowledge of the tone disabler behavior of the echo canceller involved, it provides an unobtrusive measurement of echo path delay for a particular connection.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of determining echo path delay at an echo canceller, comprising:
   generating from a location remote from the echo canceller an echo canceller disabling signal for transmission through an echo canceller for disabling echo cancellation in the echo canceller;
   determining a duration of an echo canceller disabling signal;
   determining an echo cancellation disable time for the echo canceller;
   determining an echo signal time during which the echo signal passes through the echo canceller; and
   deriving the echo path delay from the duration of the echo canceller disabling signal, the echo cancellation disable time for the echo canceller, and the echo signal time.

2. The method according to claim 1, further including determining the echo cancellation disable time from a known characteristic for the echo canceller.

3. The method according to claim 1, further including measuring the echo cancellation disable time for the echo canceller.

4. The method according to claim 1, further including determining the echo signal time using a platform for transmitting the echo canceller disabling signal and recording the echo signal.

5. The method according to claim 1, further including deriving the echo path delay by subtracting the echo cancellation disable time from the echo canceller disabling signal for a result that is subtracted from the echo signal time.

6. The method according to claim 1, further including establishing a call over a path including the echo canceller prior to transmitting the echo canceller disabling signal.

7. The method according to claim 6, wherein the path includes at least one telecommunication network selected from the group consisting of a PSTN network and an IP network.

8. The method according to claim 1, wherein the echo path delay is measured from a receive-out port of the echo canceller to a send-in port of the echo canceller.

9. The method according to claim 1, further including determining the echo signal time during single-talk conditions.

10. The method according to claim 1, further including generating the echo canceller disabling signal including a 2100 Hertz phase-reversed tone.

11. The method according to claim 1, further including determining the echo signal time after the echo canceller disabling signal is buffered by the echo canceller.

12. A method of determining an echo path delay in a network having an echo-canceller at an echo canceller, comprising performing the following steps from a location remote from the echo canceller;
   measuring a duration of an echo canceller disabling signal A;
   obtaining an echo cancellation disable time B for the echo canceller in response to the echo canceller disabling signal;
   establishing a call through the echo canceller;
   transmitting the echo canceller disabling signal;
   recording an echo signal passing through the echo canceller;
   measuring an echo duration time C from the recorded echo signal;
   computing an echo path delay as C-[A-B].

13. The method according to claim 12, further including generating the disabling signal via a computer coupled to the network.

14. The method according to claim 13, further including recording the echo signal by the computer.

15. The method according to claim 12, wherein the network includes at least one telecommunication network selected from the group consisting of an IP network and a PSTN network.

16. The method according to claim 12, further including measuring the echo duration time C during single-talk conditions.

17. The method according to claim 12, wherein the echo path delay is measured from a receive-out port of the echo canceller to a send-in port of the echo canceller.

18. The method according to claim 12, further including determining the echo signal duration after the echo canceller disabling signal is buffered by the echo canceller.

* * * * *